United States Patent [19]

Newell

[11] 4,386,884
[45] Jun. 7, 1983

[54] AUTOMATIC TUB DUMPER

[76] Inventor: Edward B. Newell, Voglers Cove, Lunenburg County, Nova Scotia, Canada, B0J 2H0

[21] Appl. No.: 257,670

[22] Filed: Apr. 27, 1981

[51] Int. Cl.³ ............................................. B65G 65/23
[52] U.S. Cl. .................................................... 414/653
[58] Field of Search ............... 414/652, 653, 639, 656, 414/139

[56] References Cited

U.S. PATENT DOCUMENTS 377,183  1/1888  White ................................. 414/653

Primary Examiner—Robert B. Reeves
Assistant Examiner—Donald Hajec
Attorney, Agent, or Firm—Ralph J. Broderick

[57] ABSTRACT

This invention provides automatic mechanical means for lifting fish and other products from the water, boat or other container to a truck, vat or other receptacle. It consists of a combination of a tub, lifted by a winch into a topless and bottomless flared container which is attached by means to a trough open at one end, the trough having tripping devices provided thereon, a line is run from a winch through two pulleys, one attached by a hook to the trough and the other to the container, the other end of the line is attached to the handle of the tub which is dropped into the water, boat or other holder of the fish or other products to be moved and fills with the product, the winch pulls the filled tub into the container and draws the container against the tripping device on the trough thus tripping the load which is flumed into the truck, vat or other receptacle, reversing the winch drops the tub to fall back into the water, boat or other container, the tub is re-filled and the process is repeated as required.

5 Claims, 2 Drawing Figures

LIFTING POSITION

U.S. Patent Jun. 7, 1983 4,386,884
FIG. 1
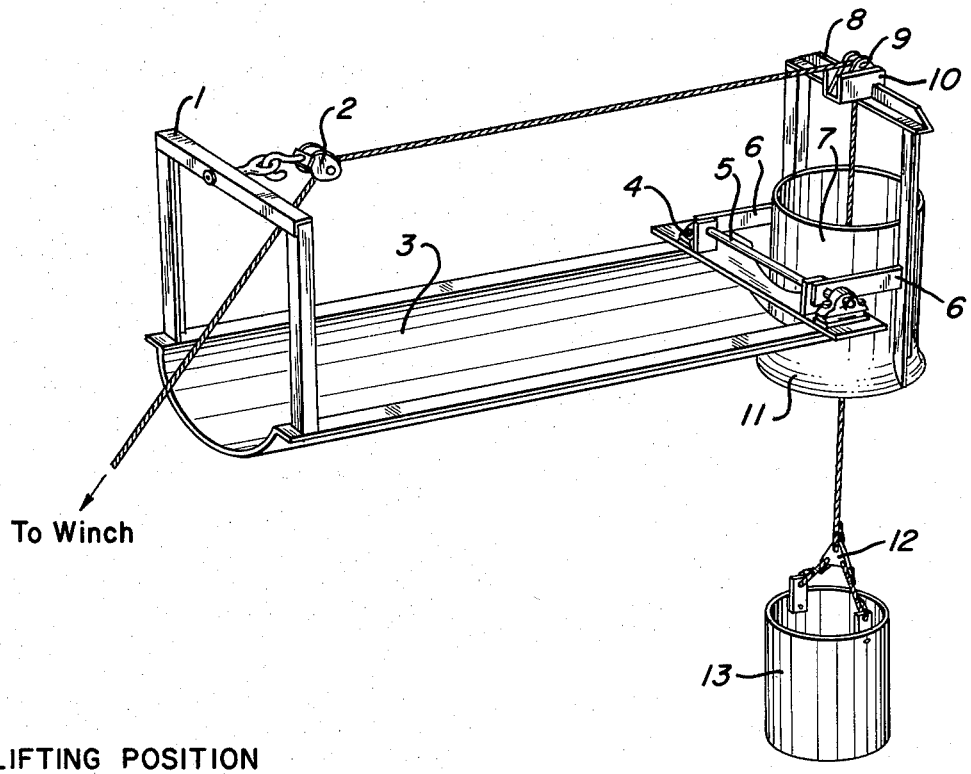
LIFTING POSITION
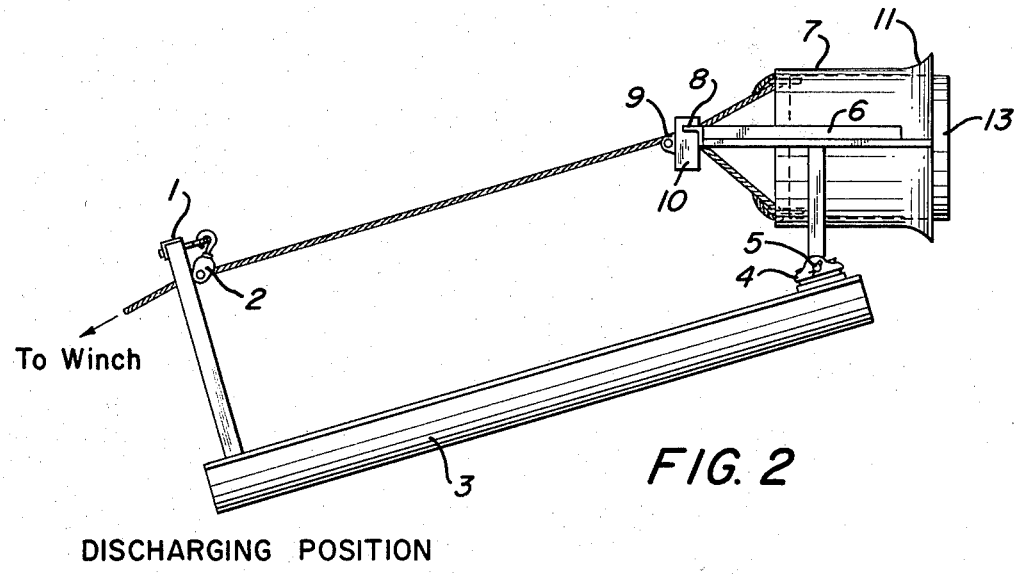
DISCHARGING POSITION
FIG. 2

AUTOMATIC TUB DUMPER

This inventive idea deals with an automatic means for lifting and dumping fish; and all other products and materials which lend themselves to the method hereinafter described; from the water, a fishing-boat or other container in which they are then held; to a truck, or holding vat, or to any other receptacle which the user may desire.

The objective of this idea is to save time and labour in the above processes and it is therefore deemed to be of general benefit to the economy.

The previous methods used; in the fishing industry in particular; but also in other work or industry; to accomplish this purpose were chiefly by manual means, which are obviously slower and more expensive that the method disclosed in this invention would be.

In the drawings illustrating the embodiments of my invention, in which a separate number is used to illustrate each separate part:

FIG. 1 is a perspective view of the entire assembly showing the lifting position.

FIG. 2 is a side elevation of the entire assembly showing the discharging position.

In the drawings the numbers 1 and 8 illustrate the support framework for the chute or trough 3 and the container 7 which are attached by conventional means to a stationary support (not shown), to hold the combination in working position, FIGS. 1 and 2.

The number 2 illustrates the single pulley which serves the purpose of stopping the tub 13 from dumping too far and changing the direction of pull. The number 3, FIG. 1, illustrates the chute to flume the product. The number 4 illustrates the pillar blocks which serve as a pivoting point or tripping device for the bottomless container 7, FIG. 2. The number 5, illustrates the shaft which connects the container 7, via its support arms 6 to the chute 3. The number 6, illustrates the support arms on the container 7, which are attached to the shaft 5, by conventional means, to pivot the container 7. The number 7 illustrates the bottomless container which actually holds the tub 13, FIG. 1, during the dumpinng procedure. The number 9, illustrates the single pulley, off center to change the direction of the pull and to guide tub 13 inside the container 7. The number 10 illustrates the mouth piece which turns the tub 13 in the proper dumping position, before dumping and stops the tub 13 which in turn promotes the dumping. The number 11 illustrates the flare on container 7. The number 12 illustrates the handle on the tub 13, which is wedge-shaped to turn the tub 13, in the mouth piece 10, for the proper dumping. The number 13 illustrates the tub which holds the product to be dumped.

The mode of use and operation of this inventive idea is as follows: The user by means of a conventional winch, (not shown), lowers the tub 13, into the product or material to be lifted and dumped, scoops up a tub 13 of the said material, then winches the tub 13 until it is wholly inside the bottomless container 7; the container 7; attached by the support arms 6 to the shaft 5 on chute 3; is winched into a dumping position by winch pressure on the pulley 9, until the tub 13 discharges its load into the chute 3, from whence it is flumed into the truck, or any other receptacle or container, as desired by the user.

When the tub 13 is dumped the winch pressure is reversed and the tub 13 is released back into the water, the fishing-boar or other container holding the product or material to be scooped up and dumped and the process is repeated as often as is required. The tub, container, bar, trough, rod, pulleys, and tripping devices may be made of metal. At least one of said parts may also be made of any material other than metal including plastic or wood. The container and tub may be circular, and the trough semi-circular in configuration.

The above is my disclosure of my invention and discovery and as it is possible that my invention and discovery may be embodied in terms or forms other than, or different from, those set out in my disclosure and specification, I claim as my invention and discovery all variations, modifications and other forms of this invention which may be justly deemed to fall in within the scope of my appended claims.

Having described by invention, I hereby particularly point out and distinctly claim and desire to secure by Letters Patent the following parts, improvements, articles and combinations as my invention and discovery:

1. A mechanical combination for lifting fish from the water or a boat and discharging same into a truck or other receptacle, consisting of a tub provided with an inverted V-shaped handle, a hollow topless and bottomless container flared at one end and a trough closed at one end and open at the other end, the container and the trough each being provided with two vertical rectangular bars, two of the said bars being attached by conventional means to a point near the open end of the trough on opposite sides thereof and two of the said bars being attached by conventional means to the opposite sides of the container, the two bars attached to the trough being connected by a horizontal bar at the tops thereof, the horizontal bar being provided with a loop to hold a pulley projecting therefrom, the two bars attached to the container, each having projecting from the other ends thereof a rectangular bar section disposed to receive and hold between them off-centre a wedge-shaped pulley, two other rectangular bars perforated at their ends are attached by conventional means to the two upright rectangular bars attached to the opposite sides of the container, the two perforated ends of the said bars are disposed and adapted to be aligned against two perforated blocks which act as tripping devices by means to the trough near its closed end, and a rod is projected through the perforations in the blocks or tripping devices and through the perforations in the two bars projecting from the bars on the sides of the container and secured by means in said position, so that the container works backwards and forwards on the bar, the horizontal bars over the top of the container and over the open ends of the trough are provided with perforations so that each may be bolted to a stationary support in alignment with the other, the container is disposed and adapted to receive the tub within it, the inverted V-shaped handle of the tub is disposed and adapted to receive one end of a line, the other end of the line running through the wedge-shaped pulley above the container to another pulley attached to the loop on the horizontal bar over the trough and thence to a conventional winch, the tub being disposed and adapted to being pulled inside the container by winch means and the container being adapted to being pulled against the blocks or tripping devices on the trough and discharging its load into the trough.

2. A combination as described in claim 1, in which the container is circular in configuration and the tub circular in configuration and the trough semi-circular in configuration.

3. A combination as described in claim 1, in which the tub, container, bar, trough, rod, pulleys and tripping devices are made of metal.

4. A combination as described in claim 1, in which at least one of said parts is made of plastic.

5. A combination as described in claim 1, in which the said parts and any parts thereof are made of wood.

* * * * *